United States Patent [19]

Sun

[11] Patent Number: 5,196,961
[45] Date of Patent: Mar. 23, 1993

[54] WIND-ACTUATED FLASHING ROAD SIGN

[76] Inventor: Chih-Kuo Sun, c/o Hung Hsing Patent Service Center P.O. Box 55-1670, Taipei (10477), Taiwan

[21] Appl. No.: 829,969

[22] Filed: Feb. 4, 1992

[51] Int. Cl.$^5$ ............................ G02B 5/12; G09F 7/22
[52] U.S. Cl. ..................................... 359/522; 40/612; 40/479; 116/63 P; 116/202; 359/552
[58] Field of Search ..................... 116/202, 265, 63 P; 40/479, 612; 73/188; 359/522, 555

[56] References Cited

U.S. PATENT DOCUMENTS

| 1,670,488 | 5/1928 | Witcomb | 73/188 X |
|---|---|---|---|
| 2,016,852 | 10/1935 | Buseman | 40/479 |
| 2,965,991 | 12/1960 | Simmons | 40/479 |
| 3,292,569 | 12/1966 | Trigilio | 116/63 P |
| 3,478,585 | 11/1969 | Scannell | 73/188 |
| 3,971,692 | 7/1976 | Anderson | 359/555 X |
| 4,316,651 | 2/1982 | Hosken | 359/525 |
| 4,353,179 | 10/1982 | Jennings | 40/479 |
| 4,524,533 | 6/1985 | Still, Jr. | 40/612 X |

FOREIGN PATENT DOCUMENTS 463479 3/1950 Canada .
554559 1/1957 Italy .

Primary Examiner—Daniel M. Yasich

[57] ABSTRACT

A road sign includes: a rotor disk rotatably mounted on a frame having a retroreflective sheet formed on a first surface of the rotor disk capable of reflecting any incident light projecting onto the retroreflective sheet for forming a bright surface of said disk, and a light-absorptive surface formed on a second surface of the rotor disk opposite to the first surface capable of absorbing incoming lights projecting onto the light-absorptive surface for forming a dark surface of the disk, whereby upon a blowing of wind on the rotor disk, the disk will be rotated to subsequently orient the first bright surface frontwardly and then orient the second dark surface frontwardly, thereby causing a flashing operation for serving as an effective road sign.

6 Claims, 3 Drawing Sheets

1

WIND-ACTUATED FLASHING ROAD SIGN

BACKGROUND OF THE INVENTION

Thomassen disclosed a rotatably mounted display means in his Italian Patent No. 554559 comprising a metal plate 10, two side walls 11 perpendicularly and oppositely mounted on the plate 10, and a frame 16 for rotatably mounting the plate 10 on the frame 16 about an axis 17. However, such a rotatable display when inferentially used for a roadway sign, may have the following drawbacks:

1. If the axis 17 for rotating the plate 10 is vertically erected as shown in FIG. 1 of its Italian Patent disclosure, the plate 10 may not be precisely oriented to present a fully circular shape if no wind is blown onto the plate, thereby influencing its normal traffic signing purpose.
2. If the axis 17 is inferentially arranged to be horizontally posed and no wind is blown, the plate 10 may be inclinedly positioned to influence its normal signing function if no counter weight is added on the plate 10.
3. Even the plate 10 may inferentially reflect any incident light projecting onto the plate for traffic warning or indicating purpose, the optical reflective effect is not so good to reduce its warning or indication function. Nevertheless, the plate 10 may be coated with retroreflective material for increasing its optical reflective property. If by coating two retroreflective sheets on two opposite surfaces of the plate 10, the plate 10, once being rotated, may reflect any incident light, but will not exert a flashing effect since both surfaces can reflect the incoming light rays.
4. Naturally, if only a single surface of the plate 10 is coated with retroreflective material, the other metal surface of the plate may still reflect light, thereby being unable to produce a flashing effect for an increased traffic warning effect.

Caper disclosed a weighted pivoted sign in his Canadian Patent No. 463,479 by incorporating a weighting medium 6 within a horizontal element 4 of the base mmber M mounted on a lower portion of the panel P. Since the panel P and the base member M are not symmetrically disposed on an upper and a lower side of an axis of the trunnions 2, how can it be rotated smoothly and effectively even subjected to a wind pressure acting upon the panel P and the base member M?

The present inventor has found the drawbacks of the conventional displays and signs, and invented the present flashing sign actuated by wind.

SUMMARY OF THE INVENTION

The object of the present invention is to provide a road sign including: a rotor disk rotatably mounted on a frame having a retroreflective sheet formed on a first surface of the rotor disk capable of reflecting any incident light projecting onto the retroreflective sheet for forming a bright surface, a light-absorptive surface formed on a second surface of the rotor disk opposite to the first surface capable of absorbing incoming lights projecting onto the light-absorptive surface for forming a dark surface, the rotor having an upper blade circumferentially formed on an upper semi-peripheral edge portion of the rotor disk and protruding frontwardly towards an observer's eyes from the first surface provided with the retroreflective sheet and having a lower blade circumferentially formed on a lower semi-peripheral edge portion of the disk and protruding rearwardly from the second surface provided with light-absorptive surface opposite to the upper blade, whereby upon a blowing of wind on the rotor disk, the disk will be rotated to first orient the bright surface frontwardly and then subsequently orient the dark surface frontwardly, thereby causing a flashing operation of the rotor disk for serving as an effective road sign.

DETAILED DESCRIPTION

Figures 1, 2:
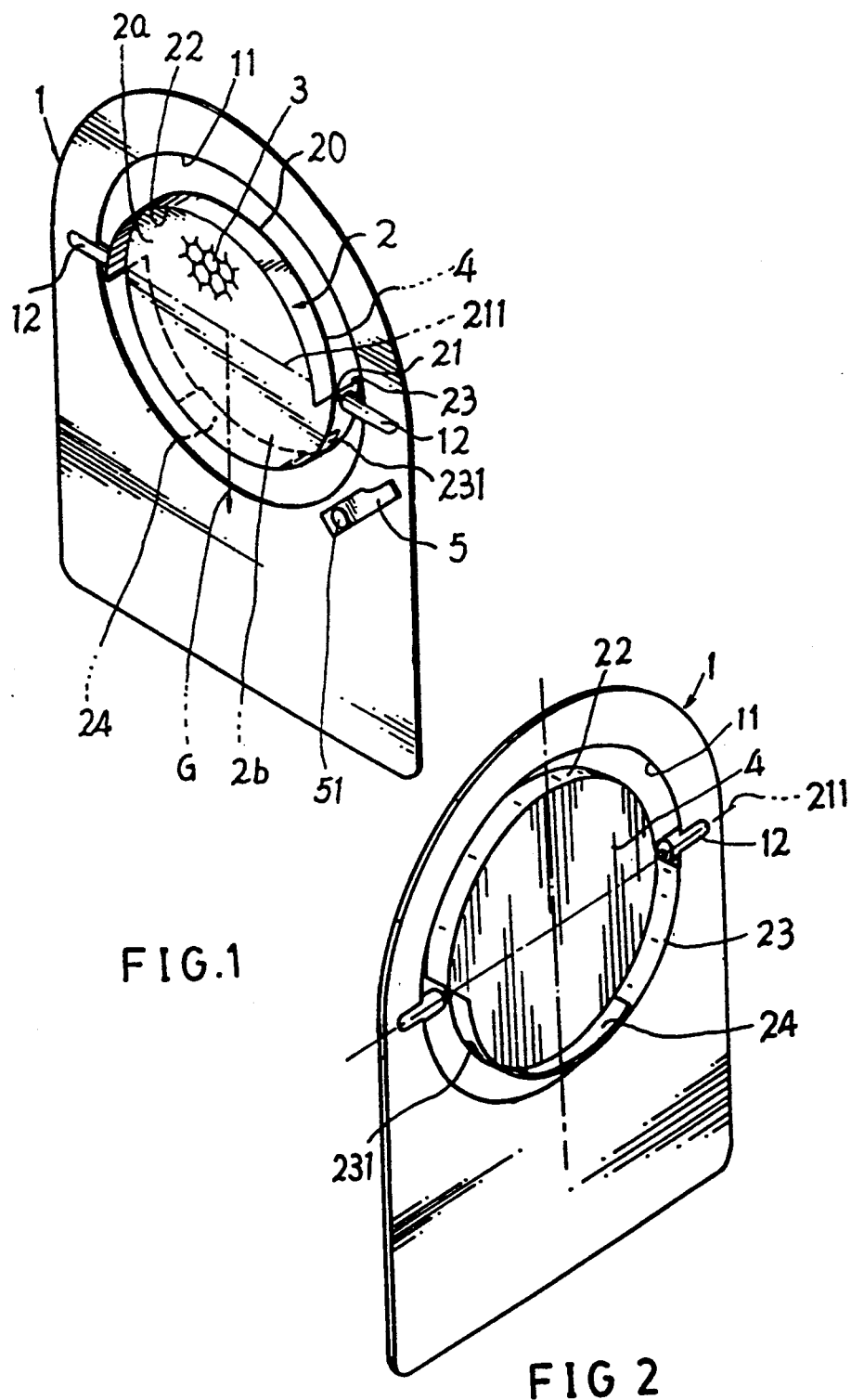
FIG. 1 is a perspective view of the present invention having a retroreflective surface oriented frontwardly.
FIG. 2 shows a sign of the present invention having a light-absorptive surface facing frontwardly.
Figure 3:
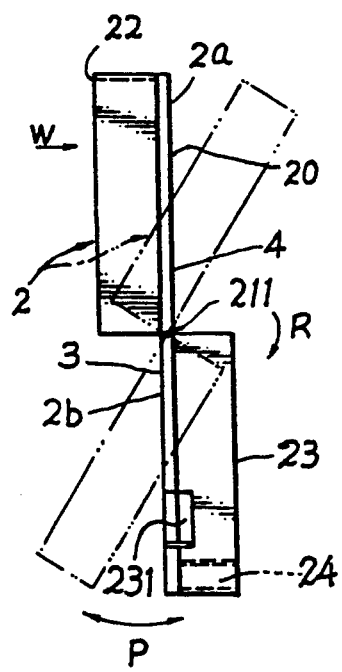
FIG. 3 is a right-side view of a rotor disk of the present invention.
Figure 4:
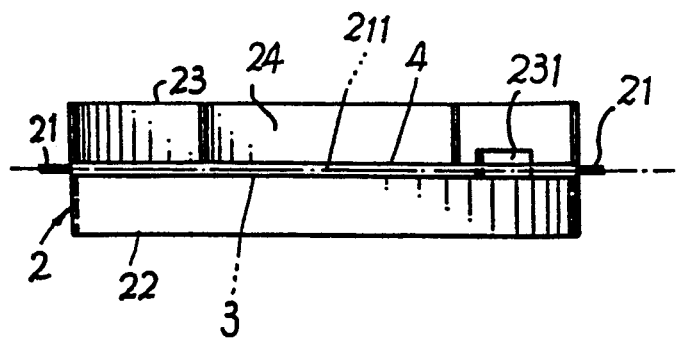
FIG. 4 is a top view of the rotor disk of the present invention.

As shown in FIGS. 1-4, the present invention comprises: a frame means 1, a rotor means 2, a retroreflective sheet 3, a light-absorptive surface 4, and a locking means 5.

The frame means 1 includes: a rotor opening 11 formed in the frame means 1, and a pair of brackets 12 horizontally formed on a central portion of the rotor opening 11 and disposed on two opposite edge portions of the opening 11.

The rotor means 2 includes: a rotor disk 20 having a pair of pivots 21 protruding transversely from two opposite end portions of the rotor disk 20 to be rotatably mounted in the pair of brackets 12 formed on the frame means 1 having a rotating axis 211 aligned with a horizontal center line (or diameter) of the disk 20 aligned between the two pivots 21, an upper blade 22 circumferentially formed on an upper semi-peripheral edge portion 2a above the rotating axis 211 and protruding frontwardly from the disk 20 to be perpendicular to the disk 20, a lower blade 23 circumferentially formed on a lower semi-peripheral edge portion 2b below the rotating axis 211 and protruding rearwardly from the disk 20 to be perpendicular to the disk 20, and a weight 24 secured on the lower blade 23 and disposed about a gravity center line G of the rotor means 2.

The retroreflective sheet 3 composed of retroreflective material is formed on a first side surface of the rotor disk when the rotor disk is normally pendant by the weight 24 added on the lower blade 23; whereas the light-absorptive surface 4 formed as a black body, formed with black-color or dark-color surface or coated with black-color surface coating material such as a black paint is provided on a second side surface of the rotor disk opposite to the first side surface of the disk provided with the retroreflective sheet 3.

The locking means 5 includes a latch pivotally mounted on the frame means 1 by a pin 51 operatively engageable with a slot 231 formed in the lower blade 23 of the rotor means 20 for stably locking the rotor disk 20 for preventing the disk 20 from its rotation, if necessary.

Figure 5:
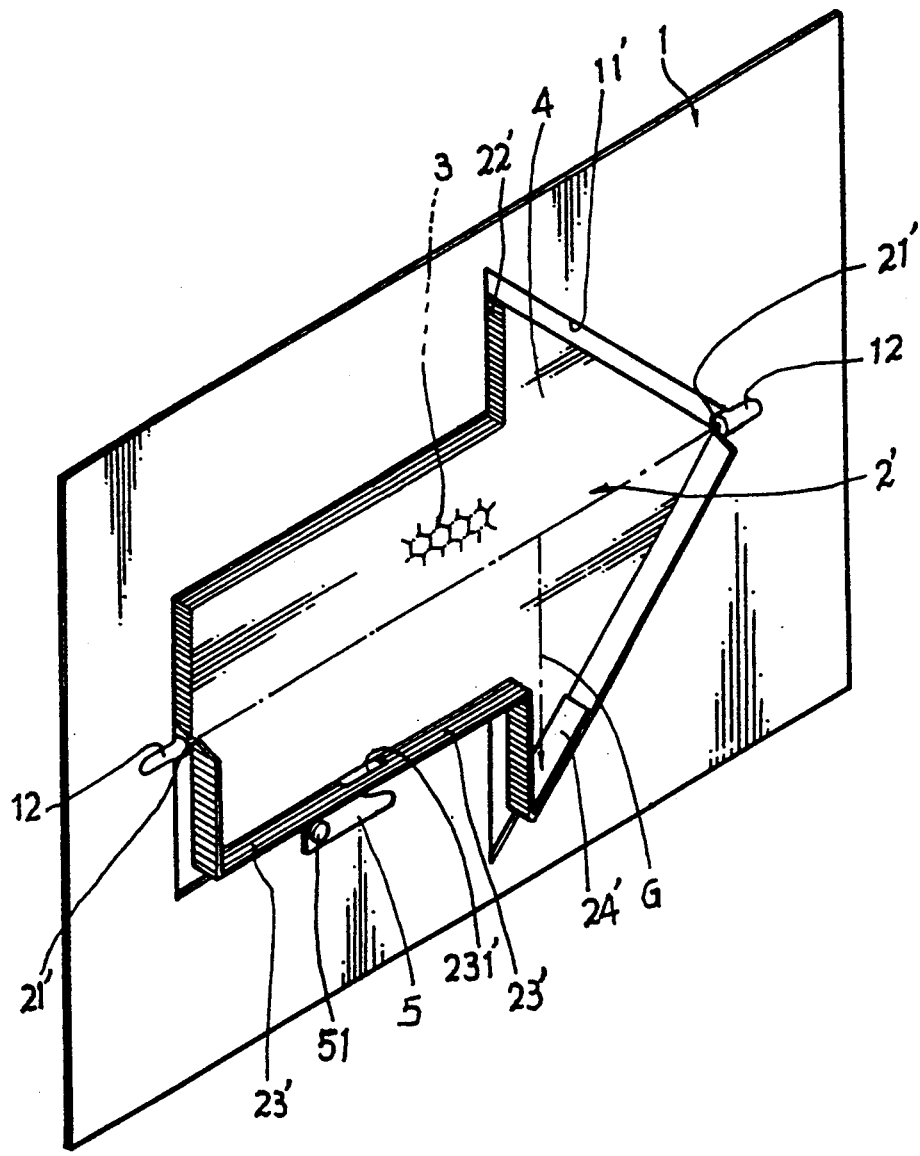
FIG. 5 is a rear view of another preferred embodiment of the present invention.

The shape of the rotor disk 20 of the present invention is not limited, which may be a circular shape as shown in FIG. 1 or may be modified to be an arrow direction indicator as shown in FIG. 5 in which the numerals 2, 24, 11 respectively denoting the rotor means (2), the weight (24) and the rotor opening (11) of a sign as shown in FIGS. 1, 2 had been modified to be numerals 2', 24', 11' for indicating the corresponding parts of the sign as aforementioned. Other shapes or modifications may be made in accordance with the present invention without departing from the scope and spirit of this invention.

In operation of the present invention, even a breeze or slight wind pressure may cause a vibration ("P" of FIG. 3) of the rotor disk 20 because a weight 24 is provided on a lower portion of the disk 20 about a "fulcrum" of the rotating axis 211 of the pivots 21 of the rotor means 2. If the wind pressure of an environmental wind is increased to act upon the rotor disk 20, the disk 20 will be rotated in direction R (FIG. 3) about the axis 211 since the wind W is respectively "caught" by the blades 22, 23. The aforementioned slight vibration (P) of the disk 20 may help initiate a repeated rotation of the disk 20 when subjected to an enough wind pressure so that the weight 24 is helpful for starting a continuous rotation of the rotor disk 20 of the present invention.

During a smooth rotation of the rotor disk 20, the retroreflective sheet 3 on the first side surface of the disk 20 will reflect any incident light projecting towards the first side surface to form a "bright" color on the disk; whereas the light-absorptive surface or dark surface formed on the second or opposite side surface may form a "dark" or "black" color, thereby forming a bright-and-dark flashing operation for effectively serving as a "dynamic" road sign.

Even no wind blows, the rotor disk 20 will be gravitationally vertically pendant by the weight 24 to allow the retroreflective sheet 3 of the rotor means facing or orienting frontwardly towards an observer's eyes for serving as a "static" road sign.

The present invention is superior to a conventional rotatable sign or display with the following advantages:

1. The rotor disk having retroreflective and black surfaces on its two opposite side surfaces capable of exerting a flashing effect when rotated under wind pressure.
2. The weight 24 is loaded on the rotor with symmetrical shape, thereby causing a smooth rotation of the rotor under strong wind pressure, and positioned at a gravity center line of the rotor, thereby exerting a pendulum vibration under slight wind pressure helpful for starting a continuous rotation.

I claim:

1. A road sign comprising: a frame means having a rotor opening formed in said frame means; a rotor means including a rotor disk rotatably mounted in said rotor opening of said frame means having a retroreflective sheet formed on a first side surface of said rotor disk capable of reflecting an incident light projecting towards said retroreflective sheet on said disk for forming a bright surface on said first side surface, a light-absorptive surface formed on a second side surface of said rotor disk opposite to said first side surface capable of absorbing incident light for forming a dark surface, an upper blade formed on an upper portion of said rotor disk and protruding frontwardly towards an observer's eyes from said disk, a lower blade formed on a lower portion of said disk and protruding rearwardly from said disk opposite to said upper blade, and a weight formed on a lower portion of said disk; whereby upon an action of a slight wind pressure on said rotor disk, said rotor disk will be pendulously vibrated for helping an initiation of a rotation of said rotor disk, and upon a further action of an increased wind pressure on said disk, said disk will be driven and rotated to first orient said bright surface frontwardly as effected by said retroreflective sheet on said first side surface of said disk and then subsequently orient said dark surface frontwardly as effected by said light-absorptive surface on said second side surface, thereby causing a flashing operation by a continuous rotation of said rotor disk when subjected to a wind pressure.

2. A road sign according to claim 1, wherein said light-absorptive surface on said second side surface of said rotor disk is selected from: a black body, a black color surface coating, a dark color surface formed on said second side surface of said disk opposite to said retroreflective sheet on said first side surface.

3. A road sign according to claim 1, wherein said frame means includes: said rotor opening formed in the frame means for rotatably mounting said rotor means, and a pair of brackets horizontally formed on a central portion of the rotor opening and disposed on two opposite edge portions of said opening.

4. A road sign according to claim 3, wherein said rotor means includes: said rotor disk having a pair of pivots protruding transversely from two opposite end portions of the rotor disk to be rotatably mounted in the pair of brackets formed on the frame means about a rotating axis aligned with a horizontal center line of the disk aligned beteeen the two pivots, an upper blade circumferentially formed on an upper semi-peripheral edge portion above the rotating axis and protruding frontwardly from the disk to be perpendicular to the disk, a lower blade circumferentially formed on a lower semi-peripheral edge portion below the rotating axis and protruding rearwardly from the disk to be perpendicular to the disk, and a weight secured on the lower blade and disposed about a gravity center line of the rotor means.

5. A road sign according to claim 1, wherein said rotor disk is formed as a circular-shaped disk.

6. A road sign according to claim 1, wherein said rotor disk is formed as an arrow-direction shape.

* * * * *